United States Patent Office 2,709,192
Patented May 24, 1955

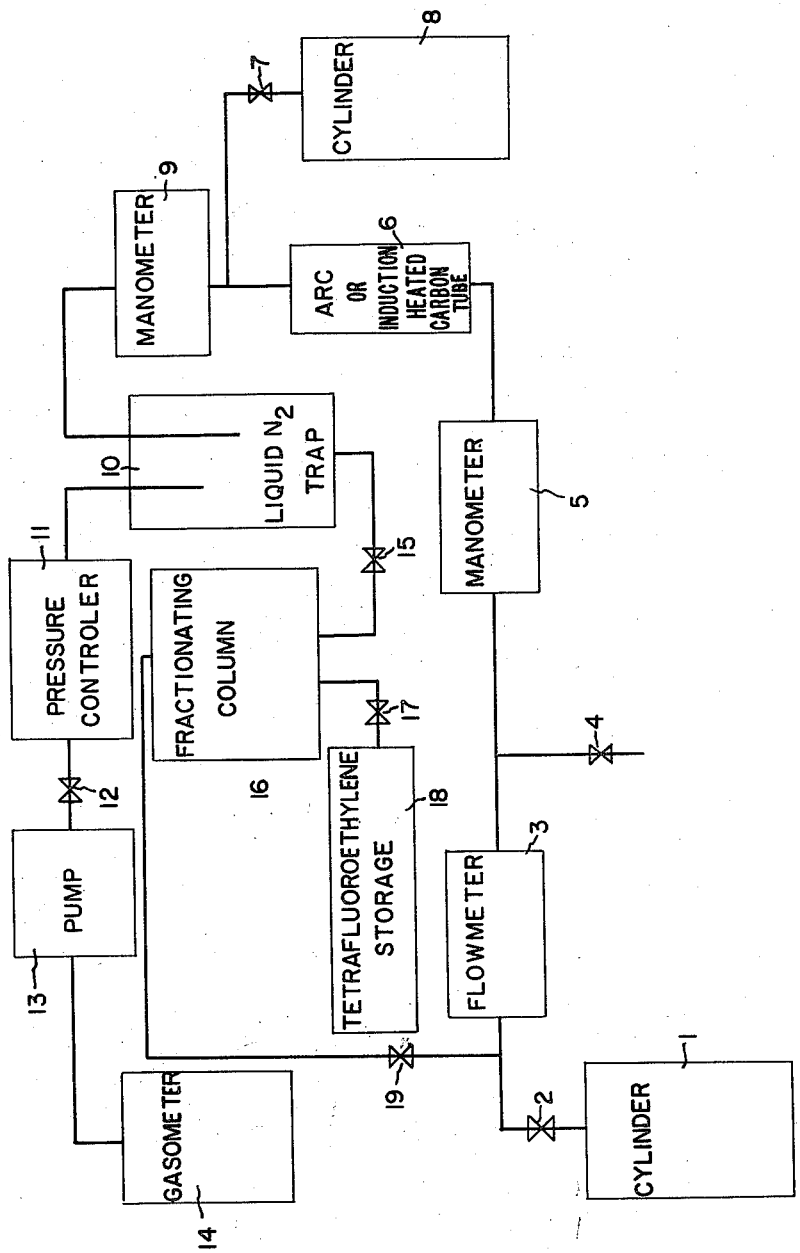

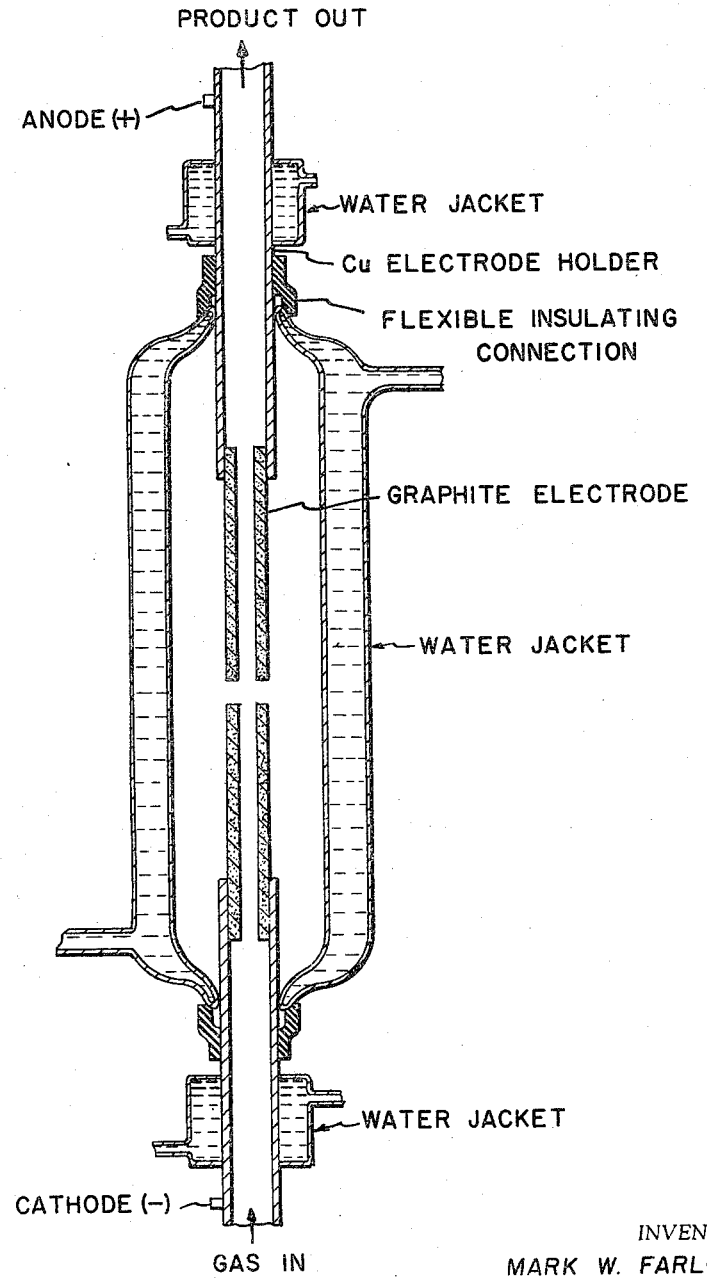

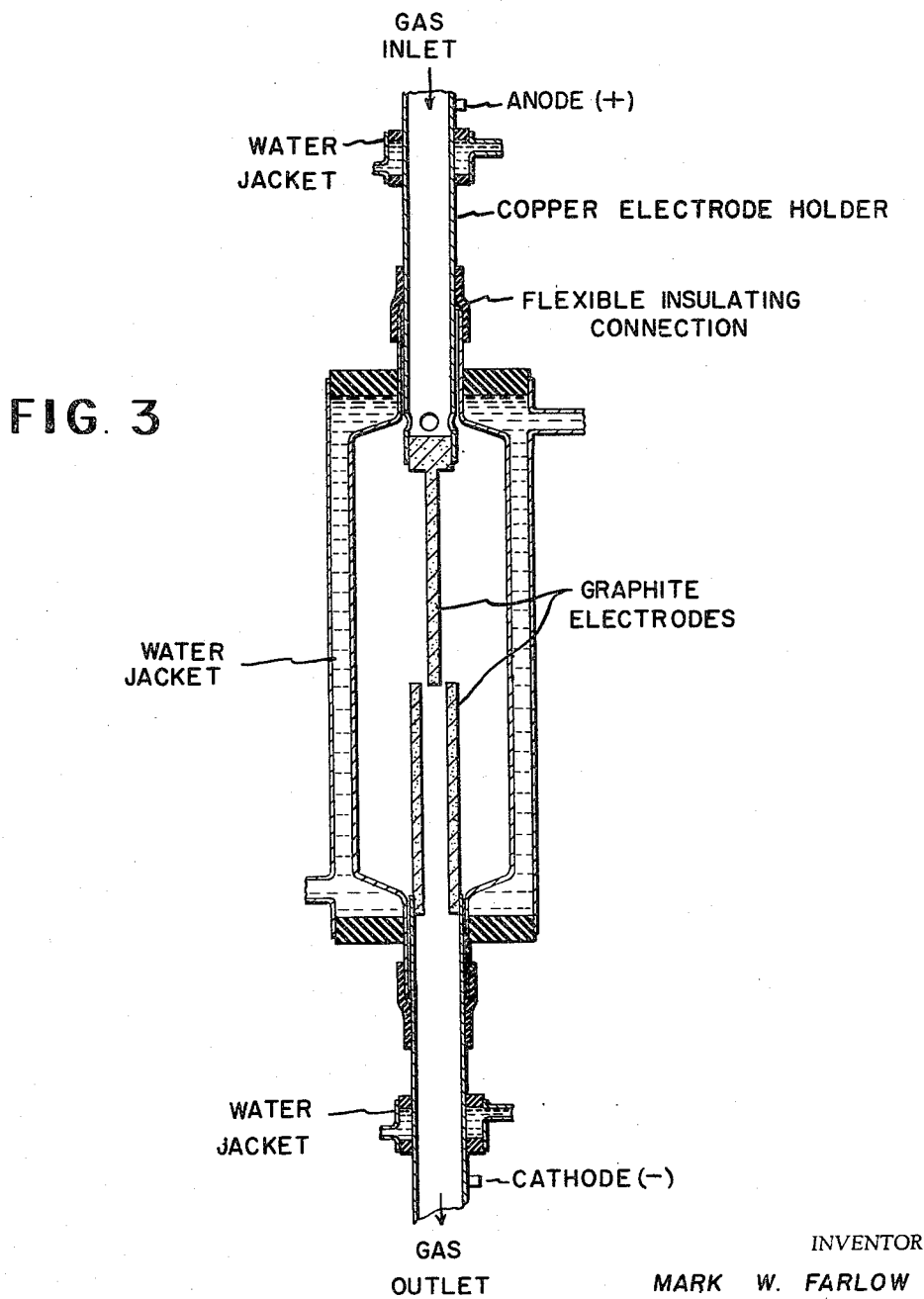

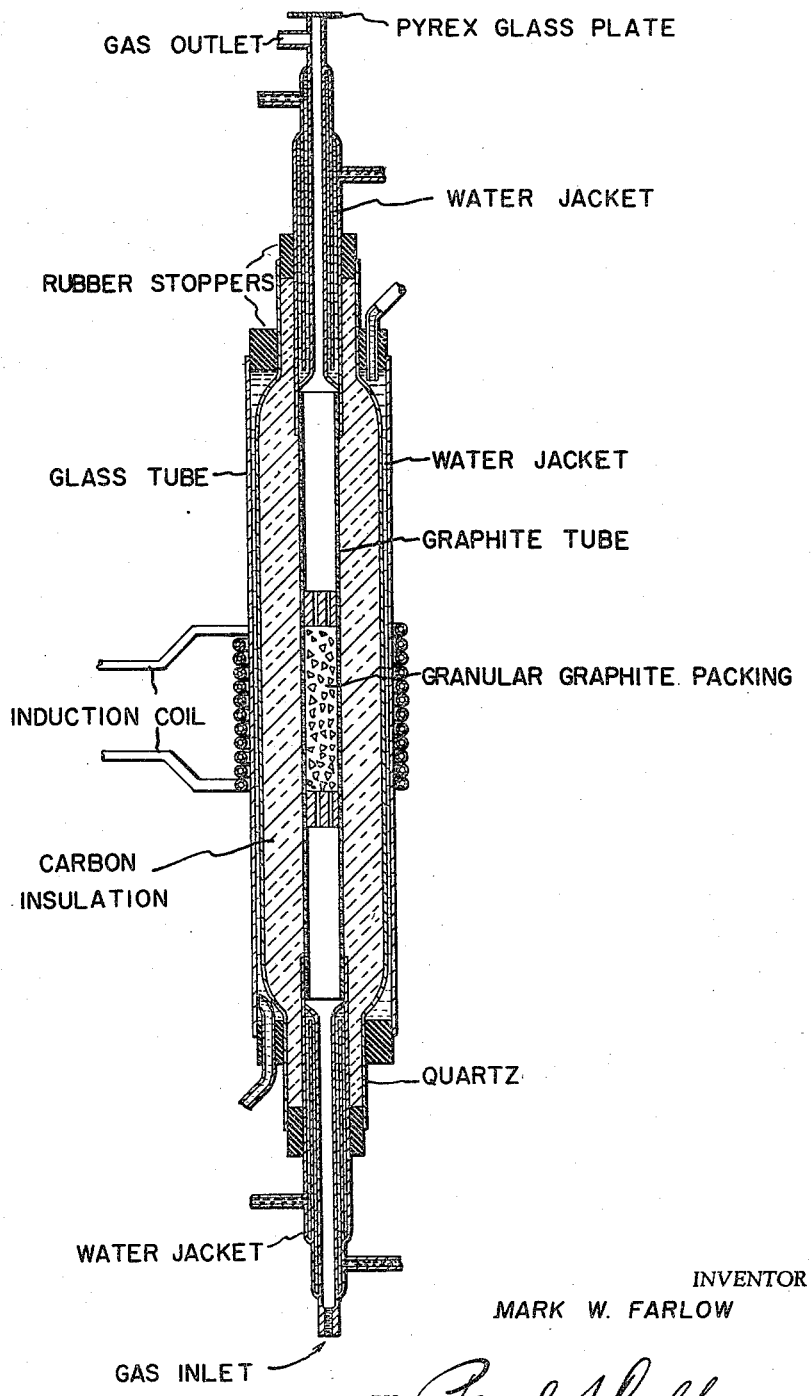

2,709,192

PROCESS OF PREPARING TETRAFLUOROETHYLENE

Mark W. Farlow, Holly Oak, Del., assignor to E. I. du Pont de Nemours and Company, Wilmington, Del., a corporation of Delaware Application December 27, 1954, Serial No. 477,678

15 Claims. (Cl. 260—653)

This invention relates to a new process for the preparation of tetrafluoroethylene.

This application is a continuation-in-part of my application Serial Number 390,441, filed November 6, 1953, now abandoned.

Tetrafluoroethylene is an unsaturated fluorocarbon of considerable utility in various applications. In particular, it is very useful in the form of its polymers which have achieved commercial success. Wider fields of use for this fluorocarbon would be attained were there more economical methods for its preparation since even in the best of the known methods, it is not possible to obtain high yields of the desired tetrafluoroethylene.

The present invention has as an object an improved method of preparing tetrafluoroethylene. Other objects will appear hereinafter.

These objects are accomplished by the present invention wherein a saturated fluorocarbon of up to two carbons, i. e., carbon tetrafluoride or hexafluoroethane, or a mixture of these two fluorocarbons, is brought into contact with carbon at a temperature of at least 1700° C. and the resultant reaction mixture is rapidly quenched. In a preferred form of the invention, the tetrafluoroethylene is separated from the quenched reaction mixture, and the remaining fluorocarbons are recycled. In this latter embodiment, complete conversion of the starting fluorocarbon to tetrafluoroethylene is achieved.

The reaction normally gives a mixture of fluorocarbons, the preponderant components of which are tetrafluoroethylene and unreacted carbon tetrafluoride or hexafluoroethane, as illustrated by the following equations:

(a) 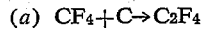
$CF_4 + C \rightarrow C_2F_4$ (b) 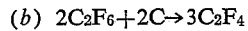
$2C_2F_6 + 2C \rightarrow 3C_2F_4$ In general minor amounts of hexafluoropropene, octafluoropropane, and sometimes still lesser amounts of other saturated or unsaturated fluorocarbons are also formed. The hexafluoropropene, octafluoropropane, and other fluorocarbons having three or more carbon atoms formed as by-products are preferably separated from the tetrafluoroethylene and then in turn converted to tetrafluoroethylene by recycling them. The process of converting such fluorocarbons to tetrafluoroethylene is described in my co-pending application U. S. Ser. No. 390,461, filed November 6, 1953.

In a preferred embodiment of this invention, the process is carried out by passing the vapor of carbon tetrafluoride or hexafluoroethane through a cylindrical graphite tube heated to a temperature of about 1700–2500° C., and preferably at a temperature of about 2000–2300° C., by an electric induction furnace, rapidly quenching the reaction mixture to minimize decomposition of the tetrafluoroethylene formed, and then separating the tetrafluoroethylene from the reaction mixture and recycling the recovered fluorocarbon starting material and other fluorocarbon by-products.

In another embodiment of the invention, the process is carried out by passing the vapor of carbon tetrafluoride or hexafluoroethane through the arc produced by passing an electric current between carbon electrodes where the temperature is generally estimated to be in the range of 2500–4000° C., rapidly quenching the reaction mixture to minimize decomposition of the tetrafluoroethylene formed, and then separating the tetrafluoroethylene from the reaction mixture and recycling the recovered fluorocarbon starting material and other fluorocarbon by-products.

Although a graphite tube heated by an electric induction furnace, or a carbon arc, is preferred for use in converting carbon tetrafluoride or hexafluoroethane to tetrafluoroethylene, these fluorocarbons can be reacted with carbon by passing them through a reactor made of other refractory material packed with carbon and heated by suitable external means, e. g., an electric resistance furnace, to a temperature of from about 1700° C. to about 4000° C. and then rapidly quenching the reaction mixture. In this embodiment, it is also preferable to separate the tetrafluoroethylene which is formed and to recycle the unreacted starting material and fluorocarbon by-products.

Practical conversions to tetrafluoroethylene can be obtained only if the product from the hot reaction zone is cooled rapidly to a temperature of about 500° C. or below, i. e., quenched. While the chemical processes that occur during quenching are not well understood, it has been demonstrated that quenching of the product from the reaction temperature to a temperature no higher than about 500° C. is essential to the success of the process. The time during which the reaction mixture is cooled, i. e., the time of transition from the reaction temperature to about 500° C. should not exceed one second. It preferably is in the range 0.001 to 0.1 second.

In carrying out the reaction in the preferred embodiment involving the use of a graphite tube packed with granular graphite, satisfactory heating of the reaction zone can be obtained by conventional electric induction heaters. Power supplied to the heating unit by a commercial 7.5 kva. converter operated at 350–400 kc. is satisfactory for small scale runs. Converters of larger capacity are used in large scale operation.

Carbon arcs can be operated at low or high voltages and with either direct or alternating current. All of these various arc operating conditions can be employed in the process of this invention. Especially good results in the pyrolysis process are obtained when the fluorocarbon is passed through arcs produced between carbon electrodes by an electric current of from 10 to 50 volts and of 10 to 30 amperes. The process, however, is not limited to the use of these specific operating conditions.

The absolute pressure of the reaction gases during pyrolysis is not critical. Good results are obtained at pressures as low as 1 mm. of mercury as well as at atmospheric and even superatmospheric pressures. In general, low pressures are preferred when the fluorocarbon is reacted with carbon in an electric arc since the operation of the arc becomes more difficult with increase in pressure although superatmospheric pressures can be used if desired and are particularly advantageous when it is desired to carry out the reaction of the fluorocarbon with the carbon electrodes submerged in liquid fluorocarbon. Since carbon tetrafluoride and hexafluoroethane are low boiling fluorocarbons, they must be cooled to low temperature and/or maintained under superatmospheric pressure to provide a liquid surrounding the reaction zone. Also, superatmospheric pressures are useful when it is desired to carry out the reaction by passing the fluorocarbon through a reactor which is made of carbon or some other refractory material and packed with carbon and heated externally (e. g., by an electric induction furnace).

The optimum rate of flow of the fluorocarbon through the reaction zone depends on the electric power input to the arc or to the induction heater. The greater the electric power input the greater is the rate of flow of fluorocarbon which can be employed. The optimum rate of flow is also dependent on the efficiency of the quenching system. Thus, to obtain maximum fluorocarbon throughput, both the heating capacity and quenching capacity must be balanced.

The separation of tetrafluoroethylene from the reaction mixture can be accomplished by careful fractional distillation. Since the boiling points of hexafluoroethane and tetrafluoroethylene are quite close, more efficient fractionation is required for separation of tetrafluoroethylene from hexafluoroethane reaction mixtures than from carbon tetrafluoride reaction mixtures. These can also be separated by selective solvent extraction or by selective adsorption on solids. However, in many cases it is not essential for the tetrafluoroethylene to be completely freed of hexafluoroethane. For example, in the polymerization of tetrafluoroethylene, minor amounts of hexafluoroethane do not impair the polymerization process.

The by-product fluorocarbons obtained in the process can be recycled, together with any unreacted starting fluorocarbon, to produce more tetrafluoroethylene. This is an especially desirable aspect of the process of this invention since by such recycling of by-products complete conversion of the starting fluorocarbon to the desired tetrafluoroethylene can be accomplished.

The process of this invention is further illustrated by the following examples. In these examples the reaction is carried out in an induction heated graphite tube and in an electric arc. The general method of operation using the types of equipment shown in Figure 1 in the form of a flow sheet is as follows: The gas lines are of copper tubing. In a typical operation, the carbon tetrafluoride or hexafluoroethane is contained in a tank or cylinder 1. Valves 2, 4, and 15 and 19 are closed, and 7 and 12 are opened. The apparatus is evacuated by means of pump 13 to remove air, trap 10 is cooled with liquid nitrogen, valve 7 is closed, argon (or other inert gas) is admitted through valve 4 to the desired operating pressure, and pressure controller 11 is set to maintain that desired pressure. The arc 6 is struck or the induction furnace is heated to operating temperature, the reactant gas is passed through the reaction zone (arc or induction furnace) at the desired rate (flowmeter 3), and the product is condensed in trap 10. During operation the inlet pressure of the reactant gas (manometer 5) will be appreciably higher than the exit pressure (manometer 9) because of the constriction involved in the reaction zone. When it is desired to stop the reaction, the electric current is cut off, valves 2 and 12 are closed, valve 7 is opened, cylinder 8 is cooled with liquid nitrogen, trap 10 is allowed to warm to room temperature, and the volatile reaction products are distilled into cylinder 8. Finally, if desired, cylinder 8 can be pumped to remove traces of argon or other non-condensables after which the cylinder valve is closed and the product is allowed to warm to room temperature.

In a continuous operation the trap 10 is connected, through valve 15 to fractionating column 16 which separates, so far as possible, the tetrafluoroethylene from the efflux from the reaction zone, sends the tetrafluoroethylene to storage 18, and returns the remaining products through valve 19 and flowmeter 3 to the reaction zone 6. The separation of tetrafluoroethylene from carbon tetrafluoride in an efficient fractionator is readily effected and the separation of tetrafluoroethylene from hexafluoroethane can be effected in a highly efficient fractionating column.

Details of an arc when employed in reaction zone 6 are shown in Figure 2. The electrodes consist of hollow graphite cylinders. The water jackets are made of electrically non-conductive material. The arc is struck by bringing the two electrodes in contact momentarily, the electrode gap being thereafter controlled to attain the proper current. A direct current voltage is applied across the electrodes in a conventional manner.

Details of another type of carbon arc which gives very satisfactory results in the process of this invention are shown in Figure 3.

Details of the preferred induction-heated graphite tube furnace are shown in Figure 4. A commercial grade of graphite containing 0.1% ash is satisfactory for use in the graphite tube and carbon insulation in the induction-heated furnace. When carbon packing is used in the reaction tube, sufficient granular carbon, e. g. graphite of 4–8 mesh, is placed in the tube to fill the portion of the tube inside the induction heating coil. The granular packing is held in place by short lengths of graphite rod of diameter just less than the inside diameter of the reactor tube, and perforated lengthwise with several ⅛-inch holes. Both sections of the perforated graphite rods are pinned to the furnace tube by small graphite pins. One end of the furnace tube is fitted with a ¼-inch Pyrex glass plate to serve as a window for observation of the granular packing with an optical pyrometer. In assembling the apparatus for operation, the furnace is mounted vertically in a suitable support, the uppermost rubber stopper is moved up on the copper tube holder, and carbon insulation is added to fill the area between the graphite reaction tube and the quartz jacket. The rubber stopper is then replaced in such a way that the graphite tube, during subsequent heating, is free to expand into the copper holder. The furnace is then mounted in the desired position, either vertical or horizontal, and appropriate connections are made at the ends of the furnace for bringing in the reactants and taking off the product, water is circulated through the tube holders and furnace water jacket, and the electric current is applied to the induction heater. A suitable type of carbon insulation for use in the graphite tube furnace is a high purity acetylene black. While a commercial acetylene black having an apparent density of 0.1 has fairly good insulating properties in the furnace, it develops channels through which heat loss by radiation becomes serious. It is therefore preferable to compress the acetylene black to a density of 0.28 by pelleting, crushing, and screening. The compressed material has satisfactory chemical characteristics and shows virtually no tendency to channel during operation of the furnace. With this compressed carbon black of density of 0.28, the furnace produces a maximum temperature of 2350° C. when electric power from a 7.5 kva. converter operated at 350–400 kc. is used.

EXAMPLE I

Carbon tetrafluoride is passed through a carbon tube arc of 0.1 inch internal diameter of the type illustrated in Figure 2 by the general process illustrated by Figure 1 at a rate of 30 to 31 g. per hour, at an arc inlet pressure of 26 mm. of mercury (absolute) and an exit pressure of 6 mm. of mercury (absolute). The time within which the carbon tetrafluoride and products therefrom are cooled from the arc temperature to about 500° C. is less than about 0.01 second. The arc is operated at about 25 volts and 18 amperes direct current. The exit gases contain 76% by volume of unchanged carbon tetrafluoride, 21% of tetrafluoroethylene, and 3% of other fluorocarbons, including hexafluoroethane and hexafluoropropene. The product is subjected to distillation, the tetrafluoroethylene is isolated and the recovered carbon tetrafluoride plus by-products is recycled. The tetrafluoroethylene, which may contain traces of hexafluoroethane, can be used directly or subjected to further purification.

EXAMPLE II

Carbon tetrafluoride is converted to tetrafluoroethylene at essentially atmospheric pressure in electric arc equipment similar to that of Figure 2 except that solid cylindrical graphite electrodes are used, the gaseous reactant is introduced into one end of the arc chamber rather than through an electrode and the product is taken off from the other end of the arc chamber rather than through an electrode. A pump is connected to the inlet and outlet, the apparatus is filled with carbon tetrafluoride to a pressure of 0.85 atmosphere (absolute), and the gaseous reaction mixture is recirculated, after quenching within one second and isolating the tetrafluoroethylene after each pass, at a rate of two liters per hour for a total reaction period of 1.7 hours. During this reaction the arc is operated at 20–25 volts and 6–8 amperes direct current. The total reaction product comprises, in addition to unchanged carbon tetrafluoride, tetrafluoroethylene, hexafluoroethane and hexafluoropropene in a volume ratio of 5:2:1.

EXAMPLE III

Hexafluoroethane is passed through a carbon arc under conditions similar to those described in Example I except that the total product is recycled, after quenching within 0.01 second and isolating the tetrafluoroethylene, three times (a total of four passes through the carbon arc). The ratio of fluorocarbon products obtained is, by volume: tetrafluoroethylene, 20; carbon tetrafluoride, 35; hexafluoroethane, 20; hexafluoropropene, 2; and octafluoropropane, 1.

EXAMPLE IV

In this example a graphite tube induction furnace of the type illustrated by Fig. 4 is employed. Carbon tetrafluoride is passed through a furnace having a graphite tube ¾" diameter and 14" long packed in the center four inches with granular graphite of 4–8 mesh size at a rate of 158 g./hour with the reaction zone maintained at 2200–2300° C. (measured by an optical pyrometer focused on the granular graphite through one of the holes in the perforated graphite rods holding the granular graphite in the center of the graphite tube. The pressure of the reactant gases at the inlet to the furnace is 56 to 78 mm. of mercury (absolute), and the exit pressure is 17 to 18 mm. (absolute). For each part by weight of carbon tetrafluoride passed through the furnace there is produced 1.04 parts of a gas containing 38 volume per cent of tetrafluoroethylene, 55% of unchanged carbon tetrafluoride, and a small amount of higher fluorocarbons, including hexafluoroethane. Since mechanical losses inevitably occur, it is evident from the weight gain that carbon tetrafluoride under these conditions reacts with more than 4% of its weight of carbon. The time within which the carbon tetrafluoride and reaction products are cooled from the temperature of the reaction zone to about 500° C. is less than about one second.

EXAMPLE V

Carbon tetrafluoride is passed over granular graphite in a graphite tube induction furnace as described in Example IV, except that the rate is 123 g./hour, the furnace temperature is about 1800° C., the inlet pressure is 50 mm. of mercury (absolute), and the furnace exit pressure is 18 mm. (absolute). The reaction gases are cooled to less than 500° C. within less than one second. Fourteen per cent of the carbon tetrafluoride is converted to tetrafluoroethylene.

When carbon tetrafluoride is passed through a graphite tube induction furnace under the conditions described in Example V, with the single exception that the reaction zone is maintained at 1400° C., only about 1% of the carbon tetrafluoride is converted to tetrafluoroethylene.

EXAMPLE VI

The importance of rapid quenching of the reaction products in the process of this invention is shown by the yields of tetrafluoroethylene obtained in a series of experiments carried out with carbon tetrafluoride passed at different rates through a graphite tube induction furnace of the type described in Example IV. In these runs the reaction zone is maintained at 2000° C., and the furnace exit pressure at 12–13 mm. mercury (absolute). The rate of flow of carbon tetrafluoride through the reaction zone, the yields of various fluorocarbons obtained (yields based on the fluorine in the carbon tetrafluoride charged), and the approximate time of cooling the reaction gases from 2000° C. to about 25° C. in each of these runs are tabulated below.

Table

| | | | | |
|---|---|---|---|---|
| Rate of flow of carbon tetrafluoride, g./hr | 202 | 78 | 19 | 2.3 |
| Yields of fluorocarbons obtained, in percent: | | | | |
| $CF_4$ | 56 | 50 | 51 | 69 |
| $CF_2=CF_2$ | 35 | 37 | 29 | 5 |
| $C_2F_6$ | 5 | 7 | 11 | 7 |
| Higher fluorocarbons | 2 | 3 | 3 | 4 |
| Time for reaction gases to be cooled to room temperature, in seconds | 0.03 | 0.09 | 0.3 | 3.0 |

From the above table it is evident that the rate of cooling of the reaction gases is critical with respect to the particular products obtained. Those runs in which the reaction mixture is cooled to room temperature in less than one second give ratios of tetrafluoroethylene to hexafluoroethane and higher fluorocarbons of 3.7 to 5.0, whereas the run in which three seconds is required to cool the reaction gases, the ratio of tetrafluoroetheylene to hexafluoroethane and higher fluorocarbons is only 0.5.

EXAMPLE VII

Hexafluoroethane is passed over granular graphite in a graphite tube induction furnace of the type described above at a rate of 216 g./hour, at a furnace temperature of 1800° C., a furnace inlet pressure of 70 mm. mercury (absolute), and a furnace exit pressure of 20 mm. (absolute). Twenty per cent of the hexafluoroethane is converted to tetrafluoroethylene, 69% is converted to carbon tetrafluoride, and most of the remainder is recovered unchanged. The reaction gases are quenched from 1800° C. to less than 500° C. within 0.1 second.

EXAMPLE VIII

The graphite tube of a graphite tube induction furnace of the type described above is packed with commercial activated carbon having a particle size of 4–6 mesh. Carbon tetrafluoride is passed through this activated carbon-packed graphite tube at a rate of 120 g./hour, at a furnace temperature of 1800° C., at a furnace inlet pressure of 40 mm. of mercury (absolute), and at a furnace exit pressure of 19 mm. (absolute). The reaction mixture is cooled from the reaction temperature of 1800° C. to less than 500° C. within one second. About 16% of the carbon tetrafluoride is converted to tetrafluoroethylene and most of the remainder is recovered unchanged. The reaction product is subjected to distillation, the tetrafluoroethylene is isolated, and the recovered carbon tetrafluoride and by-products are then recycled.

The examples have illustrated the process of this invention by the preferred embodiment involving passage of the carbon tetrafluoride or hexafluoroethane through a graphite tube induction furnace and the arc formed between graphite electrodes. However, the conversion of the fluorocarbons to tetrafluoroethane can be carried out in the presence of other forms of carbon, either amorphous or crystalline. Thus, the conversion can be carried out in reactors made of, or packed with, coal, graphite, diamond, charcoal, and the various forms of carbon black such as lamp black, acetylene black, bone black, etc. While graphite electrodes are preferred for use in the electric arc embodiment, especially good results are obtained with either graphite or active carbon in an induction heated reactor process. Many well-known varieties of active carbon are available commercially. In general, active carbon is very finely divided porous carbon having a total surface area of at least 20 sq. meters per gram (Hassler, "Active Carbon," Chemical Publishing Company, 1951, page 127). Such finely divided carbons should be pelleted, or supported on supports such as